United States Patent
Dresevic et al.

(10) Patent No.: US 6,313,920 B1
(45) Date of Patent: Nov. 6, 2001

(54) SYSTEM AND METHOD FOR REMOTE PRINTING USING INCREMENTAL FONT SUBSETTING

(75) Inventors: Bodin Dresevic, Bellevue; Xudong Wu, Redmond, both of WA (US); Gerrit Bruce van Wingerden, Tokyo (JP)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/135,537

(22) Filed: Aug. 17, 1998

(51) Int. Cl.[7] .................................................. G06K 15/00
(52) U.S. Cl. ........................................ 358/1.11; 358/1.13
(58) Field of Search .............................. 358/1.1, 1.2, 1.6, 358/1.9, 1.11, 1.13, 1.14, 1.15, 1.16, 1.17, 470; 345/467, 468, 471, 472, 127, 128, 131, 144; 707/542, 529; 400/70

(56) References Cited

U.S. PATENT DOCUMENTS 5,113,355 * 5/1992 Nomura ................................ 395/109
5,299,296 * 3/1994 Padalino et al. ..................... 395/119
5,327,526 * 7/1994 Nomura .............................. 395/115

* cited by examiner

Primary Examiner—Arthur G. Evans
(74) Attorney, Agent, or Firm—Kilpatrick Stockton LLP; John S. Pratt (57) ABSTRACT

Remote printing using incremental font subsetting. A document to be printed on a remote printer is analyzed page-by-page to determine the fonts used on each page and which characters, or glyphs, from each font are needed to print the page. For the first page on which a particular font is used in the document, a "subsetted font" comprising only the glyphs used on the page by that font is generated and copied to a spool file. For each subsequent page on which a font is used, a "font delta" is created in the spool file comprising only the glyphs used on the page which have not been previously copied to a record in the spool file. Once all of the subsetted fonts and font deltas for a given page have been written to the spool file, the text information for the page is written to the spool file and the page may be printed by the print spooler. This process continues for each page in a document to be printed on a remote printer.

14 Claims, 4 Drawing Sheets

SYSTEM AND METHOD FOR REMOTE PRINTING USING INCREMENTAL FONT SUBSETTING

TECHNICAL FIELD

This invention generally relates to computer networks. More particularly, this invention relates to remote printing on computer networks. Even more particularly described, this invention relates to the remote printing of scaleable fonts on computer networks using incremental font subsetting.

BACKGROUND OF THE INVENTION

Today's computer networks typically permit users to remotely access a wide variety of peripheral devices. For instance, network computer users may be permitted access to remote hard disk drives and other storage devices, modem pools and Internet connections, printers, and other peripherals on a network which are not local to the users' computers. By remotely distributing peripherals in this manner, many users may share expensive printers, store data on a common storage device for timed backup, or access the Internet through a common connection. Each access of a remote device by a network user, however, consumes some of a limited amount of network bandwidth. Copying a large file to or from a remote hard disk drive, for example, may utilize a large portion of the network's total bandwidth and cause the network to be slower for other operations. Likewise, printing a large document on a remote printer may also consume an enormous amount of network bandwidth when the document is transmitted from the user, or client, to the computer to which the printer is physically connected, or print server.

One reason remote printing may consume so much network bandwidth is because any font contained in the document to be printed that is not installed on the print server at the time of printing must be downloaded to the print server, i.e., transmitted and installed, before printing can begin. When documents are printed remotely which contain scaleable fonts, such as TrueType or Postscript fonts, there is a large amount of information for each glyph in each font which describes how the glyph's shape is to be formed at various sizes. Accordingly, these fonts can be large and therefore require a significant amount of network bandwidth when transferred. This is especially true with respect to the remote printing of documents containing Far East fonts, such as Chinese, Japanese, or Korean language fonts, which typically have sizes of several megabytes, sometimes up to 30 megabytes, and may contain upward of 40,000 glyphs.

When documents containing Far East fonts are printed remotely, it may take several minutes to download the fonts to the print server. This is because the program responsible for printing the document, or print spooler, cannot begin printing the document until all of the fonts used on the first page (which are not already loaded on the server) are received. This is true even if only one glyph out of the entire font is used in the document. Valuable network bandwidth may therefore be wasted by downloading entire fonts to the print server when only a few glyphs from the font are actually needed to print the document.

There are two known methods of printing to a remote printer which decrease network bandwidth usage and print delays when printing documents containing large fonts such as Far East fonts. However, each of these known methods has drawbacks. The first method involves disabling remote EnhancedMetaFile (EMF) printing. Using EMF printing, the calls made by the printing application are packaged into EMF records and spooled to the remote machine to be processed. EMF printing allows immediate return to the application executing on the print client machine upon issuing the print command, because recording the EMF records on the client machine is a very quick process. The time (and CPU) consuming task of processing EMF records is then executed on the print server, where the records are eventually converted to the raw printer commands and sent to the printer.

When remote EMF printing is disabled, the EMF records are processed into raw printer commands in the client printer driver. Then the raw printer data is spooled to the remote print server and sent to the printer attached to it. Disabling remote EMF printing in this manner ensures that only the raw commands for the glyphs needed in the print job are spooled to the print server, as opposed to having to send the entire font file along with EMF records. However, the benefit of immediate return to the printing application is lost because all of the processing is being executed on the client.

If remote EMF printing is enabled, good performance and immediate return to the application is typical when no Far East fonts are used in the document to be printed. However, performance suffers when an occasional Far East font needs to be printed because the entire Far East font file must be written to the spool file, causing a slow return to the application. Moreover, because spooling of the whole Far East font file requires a significant amount of bandwidth, printing is interrupted while the font file is being spooled. When remote EMF printing is disabled, return to the application is slow because of all the processing on the client, but spooling time is reduced somewhat by sending only necessary raw printer data. The solution described herein addresses both of these shortcomings.

The second method for remote printing involves downloading to the print spooler a subset of an entire font used in the document comprising only those glyphs which are actually used in the document. By downloading only subsetted fonts ("subsetting"), a smaller number of glyphs is downloaded from the print client to the print server, and network bandwidth usage is accordingly reduced. However, in order to determine the complete list of glyphs that are used in the document, the whole document would need to be processed before the fonts used in the document could be subsetted. For a large document, the time needed to perform this operation would be substantial. Therefore, the useful feature called "printing while spooling" (printing one page while the information needed for subsequent pages is being spooled) would be lost. Consequently, the delay prior to printing the first page can be substantial. Moreover, when a large number of glyphs is used in the document and the size of the subsetted font approaches the size of the entire font, this solution still imposes long delays prior to beginning printing while the print server downloads a virtually complete font.

Therefore, there is a need for a method and system for remote printing which (1) reduces network bandwidth usage, (2) preserves fast return to the printing application and reduces print delays, and (3) which permits printing while spooling.

SUMMARY OF THE PRESENT INVENTION

The present invention satisfies the above-described needs by providing a system and method for remote printing which incrementally subsets fonts on a page-by-page basis. Using the method and system of the present invention, a document to be printed on a remote printer is analyzed page by page to determine the fonts used on each page and which characters, or glyphs, from each font are needed to print the page. For the first page on which a particular font is used in the document, a "subsetted font" comprising only the glyphs used on the page from that font is generated and copied to a spool file. For each subsequent page on which the font is used, a "font delta" is created in the spool file comprising only the glyphs used on the page that have not been used on any of the previous pages. Once all of the subsetted fonts and font deltas for a given page have been written to the spool file, the text information for the page is written to the spool file, and the page may be printed by the print spooler. This process continues for each page in a document to be printed on a remote printer.

The present invention solves all of the above-described problems by minimizing the number of glyphs transmitted to the print server and by transmitting them on a page-by-page basis. Glyphs that are not actually contained in the document to be printed are typically not transmitted to the print server, and therefore network bandwidth is reduced. Moreover, the present invention reduces print delays because the print server can begin printing immediately after the subsetted font information and the text information for the first page have been received by the print spooler. It is not necessary for the print server to wait until all of the font or text information for the entire document has been received to begin printing. Additionally, the present invention permits printing while spooling. Once the print server has received the text and font information for a particular page, it has all of the information necessary to print that page. Therefore, the print server may begin printing the page while it receives the font and text information for a subsequent page.

In one embodiment of the present invention, a software module called a print client generates a spool file which is sent over the network to a remote computer called the print server for the document to be printed. The print client generates the spool file by first examining each of the calls which describe how a page should look when printed. The print client also examines pages of the document to determine which glyphs from which fonts are needed by the print server to print the page. Specifically, the print client examines the calls which indicate that text should be printed in a referenced font. In an embodiment of the present invention, the print client examines "TextOut" calls which are used to indicate that text should be printed in a referenced font in the Windows operating environment. As the print client examines these calls, it creates and maintains two lists for each font used in the document which do not exist on the print server.

The first list, called the "GlyphsSoFar" list, contains the identifiers for all of the glyphs which have been used in the document up to the current page for a given font. The second list is called the "DeltaGlyphs" list and contains identifiers for all of the glyphs used on the current page for a given font which have not been used on any previous page of the document. The print client updates the contents of these lists as it examines all of the TextOut calls contained on a page in the document.

When the print client encounters a call indicating that the end of the page has been reached, the print client generates the spool file records for the page. In particular, the print client generates a subsetted font for each font on the page which is being referenced for the first time within a document. The subsetted font is generated using the GlyphsSoFar list which, for the first page on which a font is referenced, contains identifiers for all of the glyphs used on the page.

The print client also generates a font delta for each font on the current page which has been referenced on a previous page in the document. The font delta is generated using the DeltaGlyphs list for the font which contains the identifiers for all of the glyphs used on the current page which have not yet been used in the document. In this manner, a subsetted font containing those glyphs necessary for the first page is written to the spool file for each font which is being used for the first time. Also, a font delta containing only the additional glyphs necessary to print the page is written to the spool file for each font which has been used for a previous page. In this manner, glyphs which have been written to the spool file for previous pages are not written again.

Once the subsetted fonts and the delta fonts for a page in the document are written to the spool file, the text information for the page is written to the spool file, and the page is ready for printing. The print client then repeats the above process for each page to be printed in the document. When the end of the document is reached, the print client then finishes up the spool file by writing a record indicating that the end-of-file has been reached.

In this embodiment of the present invention, a print server prints the document from the spool file generated by the print client. The print server may advantageously begin printing a page once the text information for that page has been written to the spool file by the print client. The print server reads the records in the spool file consecutively. If the record in the spool file is a subsetted font, the print server loads the old subsetted font. If the record is a font delta, the server merges the font delta with the corresponding subsetted font spooled previously to create a new merged font and deletes the subsetted font. The merged font is then loaded and becomes the new subsetted font. In this manner, the print server loads all of the subsetted fonts and font deltas for a given page. If the record in the spool file is a text information record, the print server will have already loaded all of the fonts necessary to print the page and the print server can then print the page. The print server will continue to process all of the records in the spool file for the document until no more records exist in the spool file. When there are no more records, the print server may delete any fonts that were temporarily loaded during the print job and delete the spool file.

In another embodiment of the present invention, the print client may make a determination for each TextOut call as to whether the referenced font contains more than a threshold number of glyphs. If the font does not contain more than the threshold number of glyphs, the print client may copy the whole font to the spool file and move to the next call. Additionally, a check may be made to ensure that a whole font with less than the threshold number of glyphs is only copied to the spool file once. Accordingly, the print server may make an additional check to determine if the current record is a whole font. If the record is a whole font, the whole font may be loaded onto the system.

In this manner, incremental font subsetting may be applied to only those fonts which contain more than the threshold number of glyphs. These large fonts are more likely to degrade network performance and slow printing if they are written to the spool file in their entirety. Because some whole fonts are copied to the spool file, some glyphs that are not used in the document will be inevitably written to the spool file in this embodiment. However, the network degradation caused by copying whole fonts with less than a threshold number of total glyphs is generally minimal and small compared to the overhead incurred by maintaining the lists of glyphs used on individual pages and generating subsetted fonts and/or font deltas. Typically, a threshold number of 3000 glyphs is sufficient to ensure that only large fonts, such as Far East fonts, are incrementally subsetted.

Therefore, it is an object of the present invention to provide a method and system for remote printing which reduces network bandwidth usage. It is also an object of the present invention to provide a method and system for remote printing which reduces print delays. It is also an object of the present invention to provide a method and system for remote printing which quickly returns control of the computer to the print client upon a request to print a document. It is a further object of the present invention to provide a method and system for remote printing which permits printing while spooling.

That the present invention and the exemplary embodiments thereof overcome the problems and drawbacks set forth above and accomplish the objects of the invention set forth herein will become apparent from the detailed description of exemplary embodiments which follows.

DETAILED DESCRIPTION OF THE PREFERRED EMBODIMENT

The present invention is directed toward a method and system for remote printing using incremental font subsetting. In one embodiment, the invention is incorporated into an operating system program entitled "Microsoft Windows NT 5.0" marketed by Microsoft Corporation of Redmond, Wash. Briefly described, the program subsets fonts contained in documents to be printed on remote printers on a page-by-page basis.

The detailed description which follows is represented largely in terms of processes and symbolic representations of operations by a conventional computer. The processes and operations performed by the computer include the manipulation of signals by a processor and the maintenance of these signals within data structures resident in one or more memory storage devices. These symbolic representations are the means used by those skilled in the art of computer programming and computer construction to convey teachings and discoveries to others skilled in the art most effectively. For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to representations of these signals as bits, bytes, words, information, modules, messages, fragments, data, images, files or the like. It should be kept in mind, however, that these and similar terms are associated with appropriate physical quantities for computer operations, and that these terms are merely conventional labels applied to physical quantities that exist within and during operation of the computer.

It should be understood that manipulations within the computer are often referred to in terms such as creating, connecting, comparing, moving, displaying, determining, uploading, downloading, selecting, playing, and the like, which may be associated with manual operations performed by a human operator. The operations described herein are machine operations performed in conjunction with various inputs provided by a human operator or user that interacts with the computer.

In addition, it should be understood that the programs, processes, methods, etc. described herein are not related or limited to any particular computer or apparatus, nor are they related or limited to any particular communication architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, aspects of the present invention and a suitable operating environment will be described.

Exemplary Operating Environment

Figure 1:
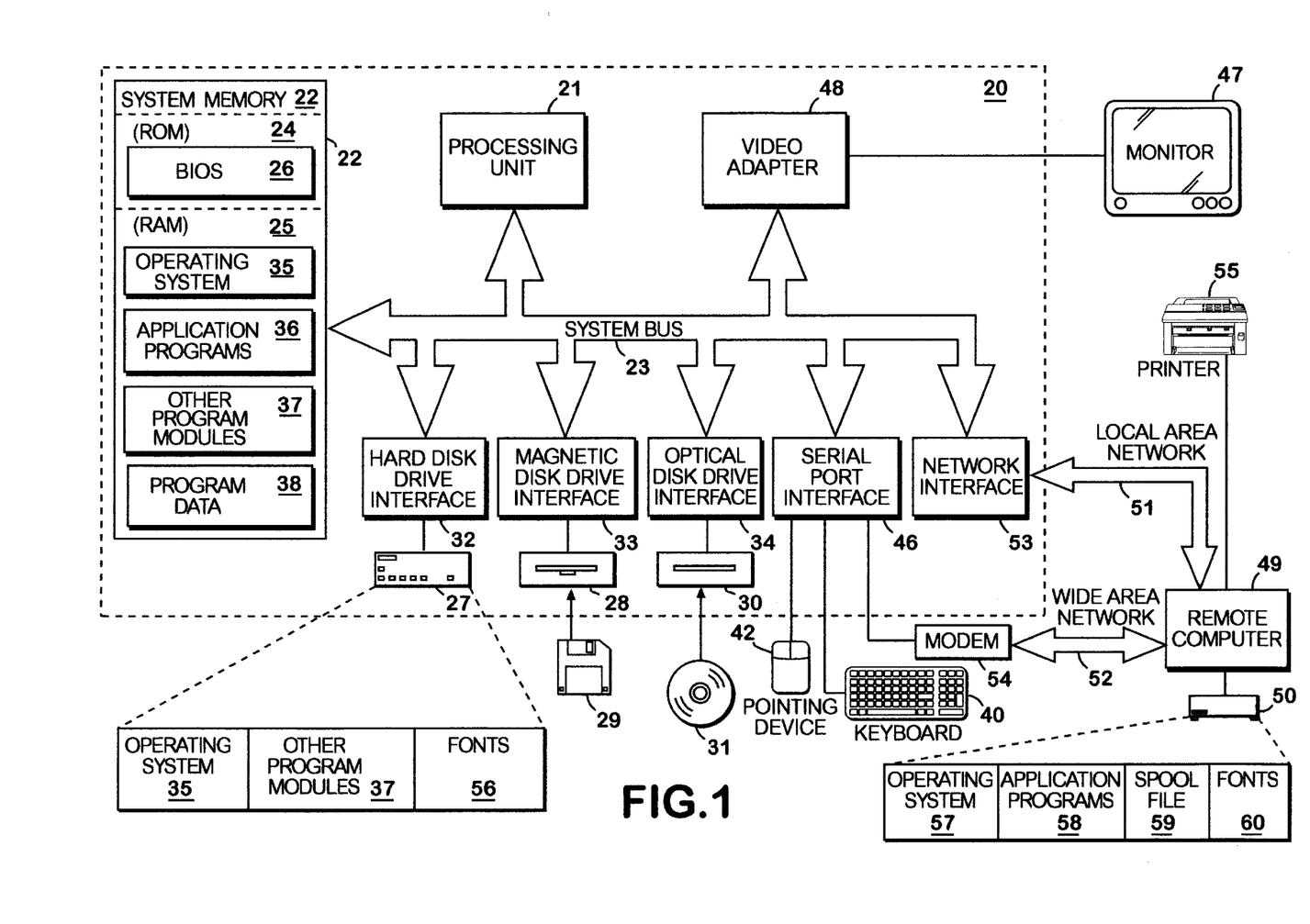
FIG. 1 is a block diagram of a networked personal computer that provides the operating environment for an embodiment of the present invention.

FIG. 1 and the following discussion are intended to provide a brief, general description of a suitable computing environment in which the invention may be implemented. While the invention will be described in the general context of an operating system program that runs in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 and a printer 55 have been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

As discussed earlier, the preferred embodiments of the present invention are embodied in program modules incorporated into an operating system 35. The operating system 35 generally controls the operation of previously discussed personal computer 20, including input/output operations such as printing. In the exemplary operating environment, the invention is used in conjunction with Microsoft Corporation's "WINDOWS NT" operating systems. However, it should be understood that the invention can be implemented for use in other operating systems, such as Microsoft Corporation's "WINDOWS 3.1" and "WINDOWS 95" operating systems, IBM Corporation's "OS/2" and "AIX" operating systems, SunSoft's "SOLARIS" operating system used in workstations manufactured by Sun Microsystems, Hewlett-Packard's "HP-UX" and "RT-UX" operating systems, systems utilizing Novell's "NetWare" network operating system, and the operating systems used in "MACINTOSH" computers manufactured by Apple Computer, Inc.

From this brief description, it should be appreciated that operating systems, such as the "WINDOWS NT" operating system, are quite complex and provide a wide variety of services that allow users and programs to utilize the resources available in the personal computer. Those skilled in the art will be familiar with operating systems and their various features. For more comprehensive information regarding the "WINDOWS NT" operating system and its interaction with programs, the reader may refer to any of a variety of publications, including the "Win32 Programmer's Reference" and "Advanced Windows", both published by Microsoft Press.

Figure 2:
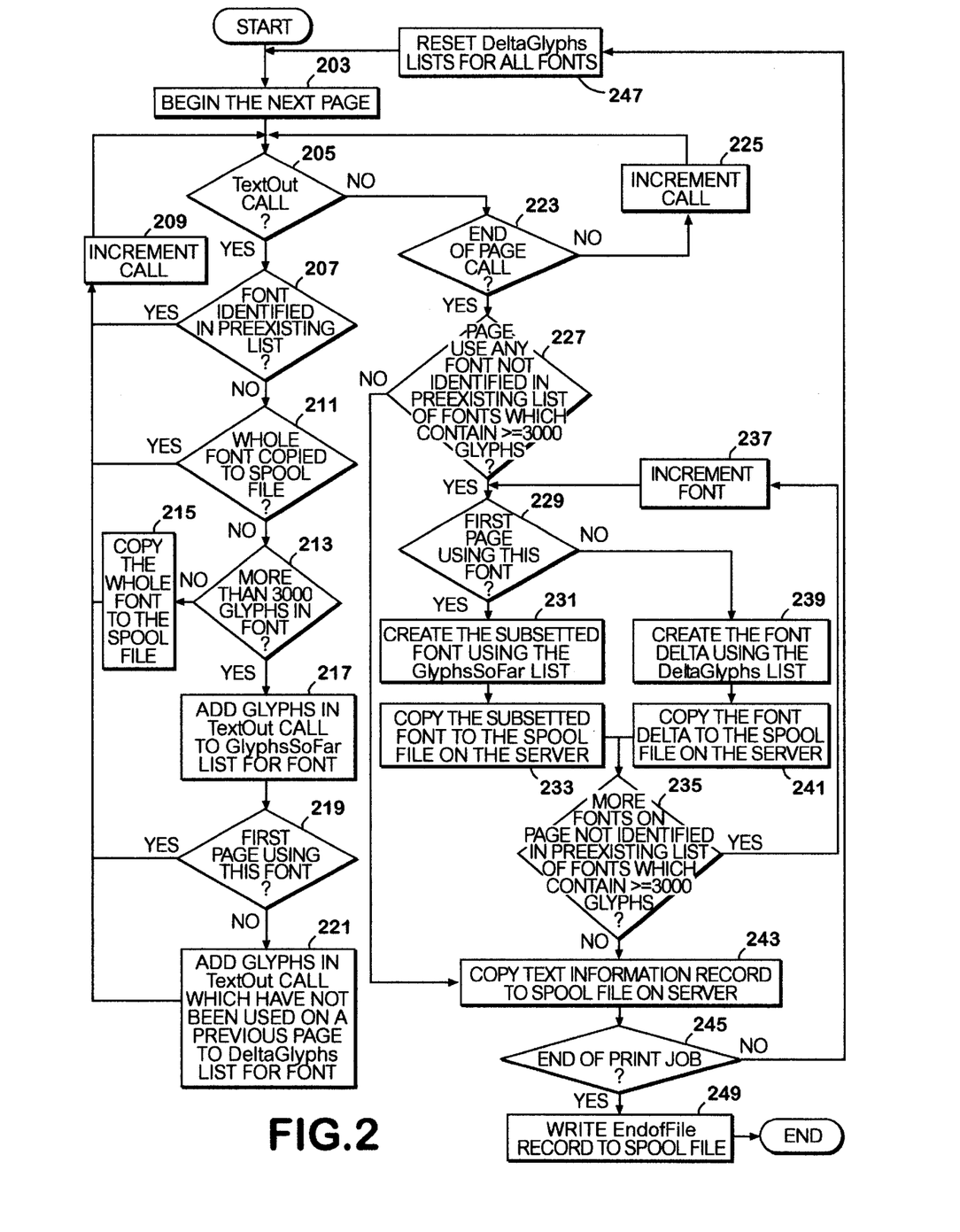
FIG. 2 is a flow diagram illustrating steps for generating a spool file for a document using incremental font subsetting.
Figure 3:
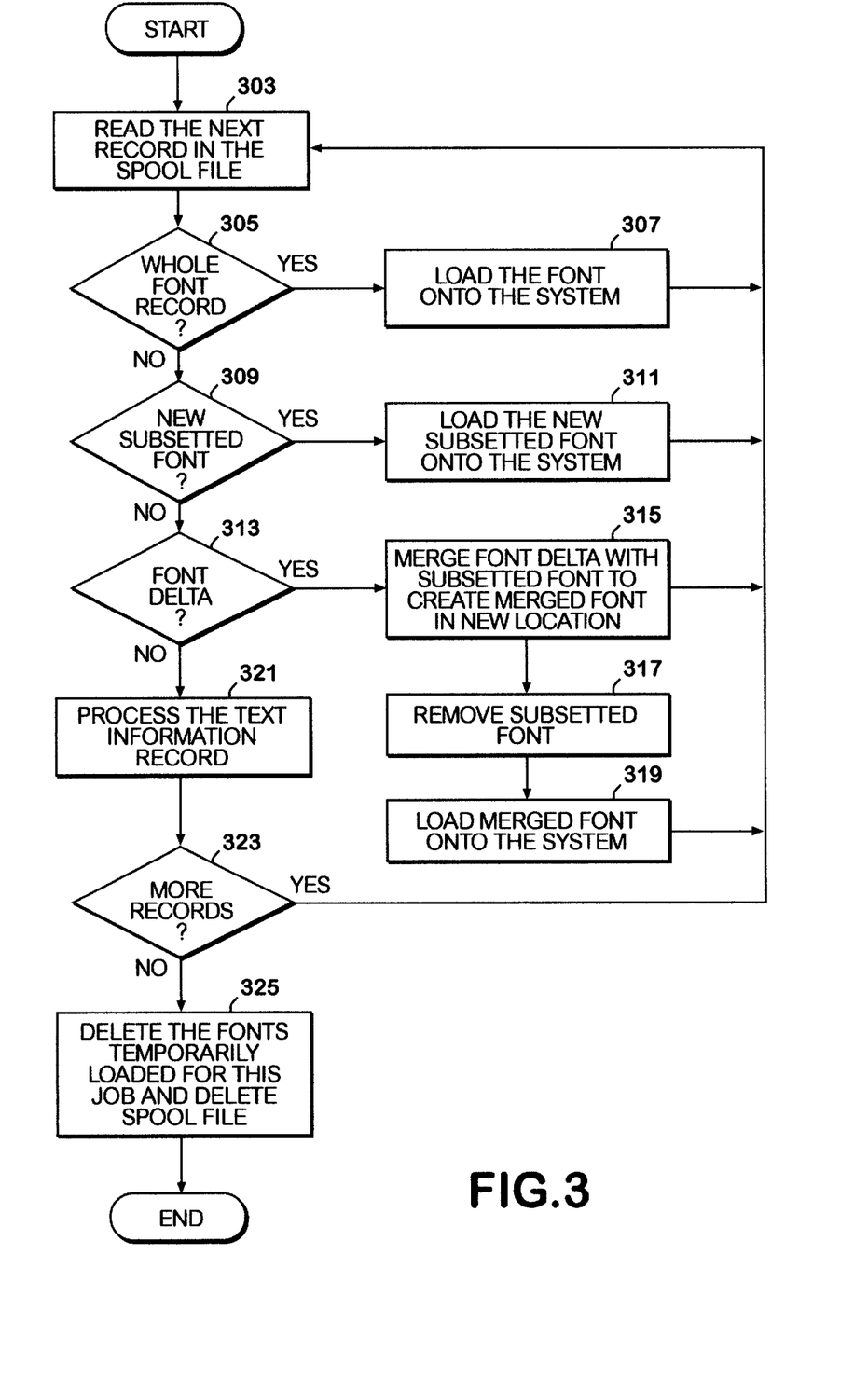
FIG. 3 is a flow diagram illustrating steps for printing a document using incremental font subsetting from a spool file.
Figure 4:
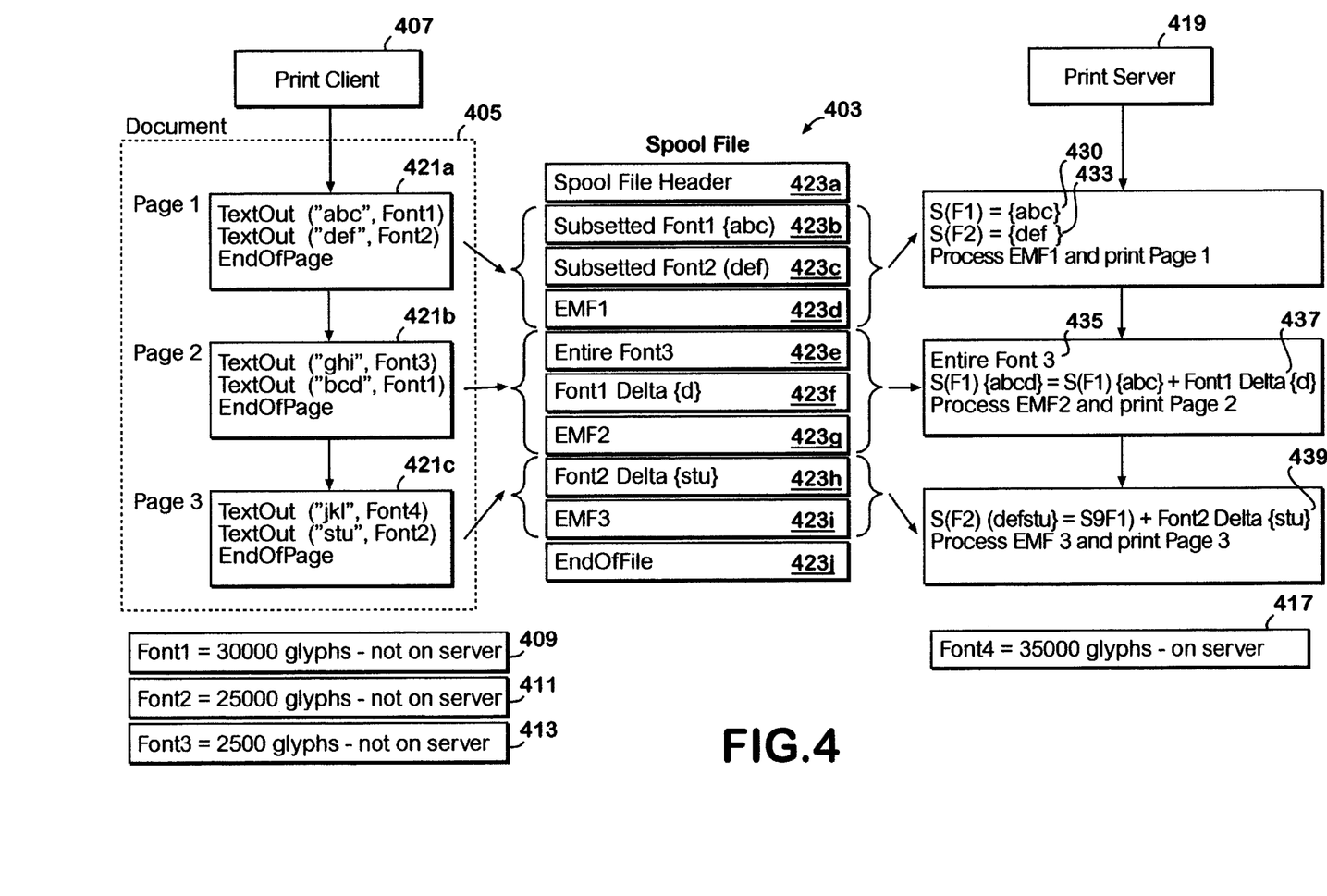
FIG. 4 is a diagram illustrating the operation of the system and method of the present invention using an exemplary document.

With the above preface on the exemplary operating environment for embodiments of the present invention, the remaining figures illustrate aspects of several embodiments of the present invention. In FIG. 2, a flow diagram is illustrated showing the steps for generating a spool file for a document using incremental font subsetting. FIG. 3 is a flow diagram illustrating the steps for printing a document using incremental font subsetting from a spool file. In FIG. 4, the operation of the method and system of the present invention are shown using an exemplary document.

The Methods of the Present Invention

The disclosed embodiment of the present invention for remote printing using incremental font comprises two separate subsetting methods. In a preferred embodiment, these methods are embodied in software modules incorporated into an operating system program. The first of these two methods processes the pages of a document to be printed and creates a spool file located on a remote server. The second of these two methods processes the spool file generated by the first process and prints the document. These methods are described in detail below.

Generating a Spool File for a Document

Referring now to FIGS. 1 and 2, the method 200 for generating a spool file for a document begins at step 203, where the next page of the document is begun. Typically, a document to be printed will be generated by an application program 36 and will be contained in RAM 25 or on hard disk 32 as program data 38. The document will typically comprise a plurality of pages, and each of the plurality of pages will comprise text information in a plurality of fonts 56. The fonts 56 used in the document will typically be stored in a separate location in RAM 25 or on hard disk 32.

In an embodiment, the pages of the document comprise a plurality of calls which describe how the page should look when displayed or printed. For example, a page may contain a call which comprises text information and a reference to a font in which the text information should be displayed or printed. Other calls may include calls which indicate that a new page should begun and calls to draw lines and other graphics on the page, etc. The methods of the disclosed embodiment for generating a spool file analyzes these calls to determine which fonts are needed to print a page. These methods are, however, equally applicable to any other means for describing or displaying a printed page containing text and font information.

In step 205, a call from the page is read, and a determination is made as to whether the call comprises both text and font information. In this embodiment, calls which comprise text information and a reference to a font are examined. If the call is a TextOut call, a determination is made in step 207 as to whether the font referenced in the call is identified in a pre-existing list of fonts. In the preferred embodiment, the pre-existing list of fonts is stored in RAM 25 or on hard disk 27 and identifies all of the fonts 60 located on the print server, such as remote computer 49. If the font referenced in the call is identified in the list, the font is already loaded on the server, and there is no need to copy the font to the spool file 59. Accordingly, a branch is taken to step 209 where the next call on the page is read, and the above steps repeat. If the font referenced in the call is not identified in the list, however, the method continues to step 211.

At step 211, a determination is made as to whether the whole font, as opposed to the subset of the font needed to print the page, has been previously copied to the spool file 59. In an embodiment of the present invention, fonts having less than a threshold number of glyphs may be copied to the spool file 59 in their entirety. If the whole font has been copied to the spool file 59 previously, there is no need to copy the font again. If the whole font has been copied to the spool file 59, a branch is taken to step 209 where the next call on the page is read and the above steps repeat. If the whole font has not previously been copied to the spool file 59, the process continues at step 213.

At step 213 a determination is made as to whether the font contains greater than a threshold number of glyphs. If the font does not contain more than the threshold number of glyphs, a branch is taken to step 215 where the whole font is copied to the spool file 59. Steps 213 and 215, therefore, ensure that only fonts with a large number of glyphs, Far East fonts for example, will be subsetted. Fonts which contain less than the threshold number of glyphs, and which are therefore less likely to degrade network performance, are copied to the spool file 59 in their entirety. In an embodiment, the threshold is set at 3000 glyphs. If it is determined at step 213 that the font contains more than the threshold number of glyphs, a branch is taken to step 217.

At step 217, identifiers for all of the glyphs in the call TextOut are added to the first list for the font. In an embodiment, this list is called a "GlyphsSoFar" list. The GlyphsSoFar list contains the identifiers for all of the glyphs in the font which have been referenced in the document up to the current call. A separate GlyphsSoFar list is maintained for each font used in the document which will be subsetted. As is discussed in more detail below, the GlyphsSoFar lists are used to determine which glyphs must be written to the spool file for a page. For a font having N glyphs, the GlyphsSoFar list is typically implemented by allocating (N+7)/8 bytes for the list. Each bit allocated represents one of the glyphs contained in the font. When a glyph is added to the GlyphsSoFar list, its corresponding bit is set to '1'. Other methods and data structures for maintaining such a list will be apparent to those skilled in the art.

At step 219, a determination is made as to whether the current page is the first page in the document in which the font has been used. If the current page is the first page in which the font has been used, a branch is taken to step 209, the call is incremented to the next call on the page, and the above steps repeat. If the font has been used on a previous page in the document, however, the method continues to step 221.

At step 221, identifiers for all of the glyphs in the TextOut call which have not been used on previous pages in the document are added to a second list associated with the font, called the "DeltaGlyphs" list in this embodiment. The DeltaGlyphs list contains identifiers for all of the additional glyphs of the font necessary to print the current page. A separate DeltaGlyphs list is maintained for each font used in the document which will be subsetted. The DeltaGlyphs lists are implemented in the manner described above for the GlyphsSoFar lists. After the spool file is processed for each page, and before beginning the next page, the DeltaGlyphs lists are reset by setting all bits to '0' so that the lists always contain only identifiers for those additional glyphs necessary to print the current page.

If it is determined in step 205 that the call is not a TextOut call, a branch is taken to step 223. At step 223 another check is made to determine if the call is an EndOfPage call. If the call is not an EndOfPage call, the method proceeds to step 225 where the next call issued by the application is processed, and the above steps are repeated. However, if it is determined in step 223 that the call is an EndOfPage call, the method continues to step 227.

At step 227 a determination is made as to whether the page uses a font which is not identified in the pre-existing list of fonts (i.e. the font is not on the server) and which contains greater than or equal to the threshold number of glyphs. If it is determined that no such fonts exist, then no large fonts exist on the page which also do not exist on the server 49, and therefore there are no fonts on the page to be subsetted. Accordingly, a branch is taken to step 243, where the text information record for the page is copied to the spool file 59. Again, because the page contains no large fonts which do not exist on the server 49, no font information is copied to the spool file 59.

If it is determined at step 227 that the page uses a font which is not identified in the pre-existing list of fonts and which contains greater than or equal to the threshold number of glyphs, a branch is taken to step 229. At step 229, a determination is made as to whether the current page is the first page to use one of the fonts which does not exist on the server 49 and which contains more than the threshold number of glyphs. If the font is being used for the first time on the page, a branch is taken to step 231, where a subsetted font is created using the GlyphsSoFar list for the font. The subsetted font contains all of the glyphs in the font that are identified in the GlyphsSoFar list. In the disclosed embodiment, the subsetted font is created using a Font Subsetting Library interface function called CreateFontPackage. This function takes as input arguments a buffer containing the image of the whole font file to be subsetted, a buffer which contains the list of glyph identifiers to be included in the subsetted font (the DeltaGlyphs or GlyphsSoFar lists), and a flag which specifies whether the output will be a subsetted font or a font delta. The CreateFontPackage function returns as output either a subsetted font or a font delta of the entire original font, depending on the state of the input flag. Methods for implementing such a function are well known to those skilled in the art.

If the font has been used on a previous page, a branch is taken to step 239, where a font delta is created using the DeltaGlyphs list for the font. The font delta contains those glyphs necessary to print the current page that have not been previously used in the document and sent to the print server 49. In this manner only those glyphs needed to print a page are written to the spool file for a page. The font delta is also created using the CreateFontPackage Font Subsetting Library interface function described above.

Once the subsetted font or the font delta has been written to the spool file 59 in either step 233 or 241, respectively, the method 200 continues at step 235. At step 235 a check is made to determine whether more fonts exist which need to be subsetted. In particular, a check is made at step 235 to determine if more fonts exist on the page which are not identified in the pre-existing list of fonts (i.e. which are not on the server 49) and which contain more than or equal to the threshold number of glyphs. If more fonts exist to be subsetted, a branch is taken to step 237 where the font is incremented to the next font to be subsetted and the above steps repeat. If no more fonts exist to be subsetted for the page, the method continues at step 243, where the text information record for the page is copied to the spool file 59. The text information record contains all of the text to be printed for the page and the font references for the text. In an embodiment, the text information record comprises an EnhancedMetaFile (EMF) record which contains text and font information along with additional information defining how graphics on the page should be printed. The terms "text information record" and "EMF record" are used interchangeably herein.

At step 245, a determination is made as to whether the end of the print job has been reached. If the end of the print job has not been reached, a branch is taken to step 247, where the DeltaGlyphs lists are reset. The above steps are then repeated from step 203 for the next page of the document to be printed. If the end of the print job has been reached in step 245, the method concludes at step 249, where an EndOfFile record is written to the spool file 59.

Printing the Document from the Spool File

Once the text information record for a page has been copied to the spool file at step 243, the method 300 for printing from the spool file may begin. As discussed above, the method for printing from the spool file is embodied in a software module incorporated into an operating system program. In an embodiment, the printing module is incorporated into the operating system program 57 running on print server 49. In this manner, the print server 49 may process the spool file 59 to print the document on the printer 55. Note that the method 200 for generating the spool file may continue while the method 300 for printing from the spool file processes the spool file and prints. In this manner, printing while spooling may occur.

Referring now to FIGS. 1 and 3, the method 300 for printing a document from a spool file 59 begins at step 303, where the next record of the spool file 59 is read. In step 305 a check is made to determine if the record is a whole font record. As discussed above, the spool file 59 may contain a whole font record if the font contains less than the threshold number of glyphs. Accordingly, if such a record is present, the whole font is loaded onto the print server 49 in step 307. In the disclosed embodiment, the whole font is loaded onto the system using the private interface function called AddRemoteFontToDC. This private function takes as input arguments the buffer which contains the image of the font to be added to the Device Context, the size of the buffer, and the handle of the Device Context (hdc). This function is very similar to the public Application Programming Interface (API) function AddFontResource. This private function is called by the spooler process to load the font image from the spool file to the printer Device Context (DC). This ensures that the font is only available for printing to this printer DC and cannot be used to display text on any other DC. Methods for implementing such a function are well known to those skilled in the art. The print server 49 must load fonts into memory in this manner prior to using them for printing. At step 307 the next record in the spool file 59 is read at step 303, and the above step repeats.

If the record is not a whole font, the method continues at step 309, where a determination is made as to whether the record is a subsetted font. A subsetted font will be present in the spool file 59 for the first page on which a font appears and contains only the glyphs referenced on the page. If the record is a subsetted font, a branch is taken to step 311 where the subsetted font is loaded onto the print server 49 using the AddRemoteFontToDC function. The method then continues at step 303 where the next record in the spool file is read and the above steps are repeated. If the record is not a subsetted font, the method continues at step 313.

At step 313, a determination is made as to whether the record is a font delta. If the record is a font delta, a branch is taken to step 315, where the font delta is merged with the subsetted font to create a new subsetted font. In the disclosed embodiment, the new subsetted font is created using a Font Subsetting Library interface function called MergeFontPackage. This function takes as arguments a subsetted font and a buffer which contains the font delta, and outputs the new subsetted font. The new subsetted font contains all of the glyphs that were contained in the old subsetted font and those contained in the font delta. Methods for creating such a function are well known to those skilled in the art.

The merged font contains all of the glyphs which were in the subsetted font and all of the new glyphs contained in the font delta. The merged font is created in a new location. At step 317 the subsetted font is removed from the print server. In the disclosed embodiment, the font is removed using the private function called RemoveRemoteFontDC. This function removes the old subsetted font from the system so that only the new subsetted font remains. RemoveRemoteFontDC is similar to the public API call RemoveFontResource.

At step 319, the new subsetted font is loaded into the print server using the AddRemoteFontToDC function. The method 300 then continues at step 303, where the next record in the spool file 59 is read and the above steps are repeated.

If it is determined at step 313 that the record is not a font delta, then the record must be a text information record. Accordingly, at step 321, the text information record is processed by the server 49. Because all of the fonts necessary to print the page will have already been loaded into the server 49, no additional information is necessary to print the page. The print server 49 therefore prints the page on printer 55. In the disclosed embodiment, the print server prints the page using the PlayEnhancedMetaFile API function call.

The method 300 continues at step 323, where a determination is made as to whether more records are present in the spool file 59. If more records are present in the spool file 59, a branch is taken to step 303, where the next record in the spool file 59 is read and the above steps repeat. If there are no more records, at step 325 the fonts loaded into the server 49 for the document are deleted, the spool file 59 is deleted, and the method ends.

Generating a Spool File For an Exemplary Document

FIG. 4 is a diagram illustrating the operation of the system and method of the present invention using an exemplary document. Referring now to FIG. 4, an exemplary document 405 contains four pages 421a–d. Pages 421a–d contain text information in fonts Font1 409, Font2 411, Font3 413, Font4

417, and Font5 415, which contain 30000, 25000, 2500, 35000, and 50000 glyphs, respectively. Font4 417 is the only font on the print server. The text information on pages 421*a–d* is represented by a plurality of TextOut calls on each page with the text information for the TextOut call indicated in quotation marks and the referenced font thereafter. The exemplary spool file 403 contains records 423*a–j*, which are generated by the method 200 as described below.

Referring now to FIGS. 2 and 4, the method 200 is described as applied to the exemplary document 405. At step 203 the first page of document 405, page 421*a,* is begun. The first record on page 421*a*, TextOut ("abc", Font1), is reads and a determination is made in step 205 if the call is a TextOut call. Because the call is a TextOut call, the method 200 continues at step 207, where a determination is made as to whether the font referenced in the TextOut call, Font1 409, is identified in a pre-existing list. As discussed above, in the exemplary embodiment the list will contain the identities of all of the fonts which exist on the print server. Therefore, because the print server does not contain Font1 409, the list does not contain the identity of Font1 409, and the method 200 will continue at step 211. At step 211 a determination is made as to whether the whole Font1 409 has been copied to the spool file.

Because Font1 409 has not been copied to the spool file in its entirety, a determination is made at step 213 as to whether Font1 409 contains more than the threshold number of glyphs. In this exemplary embodiment, the threshold number of glyphs is 3000. Because Font1 409 contains 30000 glyphs, far more than 3000, all of the glyphs in the TextOut call are added to the GlyphsSoFar list for Font1 409. The GlyphsSoFar list for Font1 409, therefore, contains the identities of glyphs "abc". In step 219 a check is made to determine whether the current page is the first page to use Font1 409. Because Font1 409 is used for the first time on page 421*a*, a branch is taken to step 209, where the call is incremented to the next call, TextOut("def", Font2), and the method 200 continues at step 205.

At step 205, a determination is made as to whether the call, TextOut ("def", Font2) is a TextOut call. Because the call is a TextOut call, a determination is made at step 207 as to whether the font referenced in the call, Font2 411, is identified in the pre-existing list. Because Font2 411 is not on the server and therefore not in the list of fonts, the method 200 continues at step 211.

At step 211, it is determined that the whole Font2 411 has not been copied to the spool file previously, and the method 200 proceeds to step 213. At step 213 it is determined that Font2 411 contains more than 3000 glyphs. Therefore, at step 217, identifiers for the glyphs contained in the TextOut call are added to the GlyphsSoFar list for Font2 411. The GlyphsSoFar list for Font2 411, therefore, contains identifiers for glyphs "def". In step 219, a check is made to determine whether the current page is the first page to use Font2 411. Because Font2 411 is used for the first time on page 421*a*, a branch is taken to step 209, where the call is incremented to the next call, EndOfPage, and the method 200 continues to step 205.

At step 205 a determination is made that the EndOfPage call is not a TextOut call. Therefore, a branch is taken to step 223 where a determination is made that the call is an EndOfPage call. Accordingly, a branch is taken to step 227, where a determination is made as to whether the page uses any font which is not identified in the pre-existing list of fonts and which contains greater than or equal to the threshold number of glyphs (3000 in this case). Because the page uses fonts (Font1 409 and Font2 411) which meet this criteria, the method 200 continues at step 229.

At step 229, a determination is made that the current page 421*a* is the first page on which Font1 409 has been used. Therefore, a branch is taken to step 231, where a subsetted font is created for Font1 409, using the CreateFontPackage function and the GlyphsSoFar list for the font. The GlyphsSoFar list contains the glyphs "abc", so the subsetted font is created to contain only these glyphs (S(F1)={abc}, where S(F1) is the subset of Font1). At step 233, the subsetted font for Font1 409 is copied to the spool file 403 on the server as record 423*b*. At step 235, a determination is made as to whether there are more fonts on the page which are not identified in the pre-existing list of fonts and which contain more than the threshold number of glyphs. Because there are such fonts (Font2 411), the font is incremented to the next font, Font2 411, and the method proceeds at step 229.

At step 229, a determination is made that the current page 421*a* is the first page on which Font2 411 has been used. Therefore, a branch is taken to step 231, where a subsetted font is created for Font2 411, using the CreateFontPackage function call and the GlyphsSoFar list for Font2 411. The subsetted font is created to contain only the glyphs "def" and is copied to the spool file 403 as record 423*c* in step 233. The method 200 then proceeds to step 235 where it is determined that there are no more fonts on page 421*a* which require subsetting. Therefore, at step 243 the text information record for the page is copied to the spool file 403 as record 423*d*. In the exemplary embodiment, the text information is copied as an enhanced metafile (EMF) record. At step 245, a determination is made that the end of the print job has not been reached, so a branch is taken to step 247 where all of the GlyphsSoFar lists are reset. The next page of the document 405, page 421*b*, is then processed, beginning at step 203.

The first call on page 421*b*, TextOut ("ghi", Font3), is read at step 205. Because the call is a TextOut call, a branch is taken to step 207. Because Font3 413 does not exist on the server and is therefore not identified in the pre-existing list, another branch is taken to step 211. At step 211, it is determined that the whole Font3 413 has not been copied to the server previously, so a branch is taken to step 213.

At step 213, a determination is made as to whether Font3 413 contains more than the threshold number (3,000) of glyphs. Because Font3 413 contains only 2,500 glyphs, a branch is taken to step 215, where the whole Font3 413 is copied to the spool file. The whole font record 423*e* is created using the CreateFontPackage function. At step 209, the call is incremented to the next call, TextOut ("bcd", Font1), on page 421*b* and the process 200 continues at step 205.

At step 205, a determination is made that the call, TextOut ("bcd", Font1) is a TextOut call. Therefore, the method 200 continues at step 207 where a determination is made that Font1 409 is not identified in the pre-existing list. At step 211, a determination is made that the whole Font1 409 has not been copied to the spool file 403, so the method 200 continues at step 213. At step 213, it is determined that Font1 409 contains more than 3000 glyphs. Accordingly, the method 200 continues at step 217 where identifiers for the glyphs referenced in the TextOut call are added to the GlyphsSoFar list for Font1 409. At step 219, a determination is made as to whether the current page is the first page on which Font1 409 has been used. Because Font1 409 was used in the previous page, page 421*a*, a branch is taken to step 221. At step 221, all of the glyphs in the TextOut call which have not been used on a previous page are added to the DeltaGlyphs list for Font1 409. Because the glyphs "b" and "c" were used for Font1 409 on the previous page, the only identifier added to the DeltaGlyphs list for Font1 409 is the identifier for glyph "d". The method 200 continues at step 209, where the call is incremented to the next call, EndOfPage.

Because the call is an EndOfPage call, branches are taken from step 205 to step 223 and then to step 227. At step 227, a determination is made as to whether the page uses any fonts not referenced in the pre-existing list of fonts, and which contain greater than or equal to 3000 glyphs. Because Font1 409 is referenced by a TextOut call on the page and meets these criteria, a branch is taken to step 229. At step 229, it is determined that the current page is not the first page which uses Font1 409. Therefore, a branch is taken from step 229 to step 239. At step 239, the font delta for Font1 409 is created using the CreateFontPackage function and the DeltaGlyphs list for Font1 409. Because the DeltaGlyphs list contains only the identifier for glyph "d", the font delta is created to contain only this glyph. At step 241, the font delta is written to the spool file 403 as record 423f.

The method 200 continues at step 235 where it is determined that there are no more fonts on the page 421b which need subsetting. Therefore, at step 243 the text information record, or EMF record, for the page 421b is copied to the spool file 403 as record 423g. At step 245 a determination is made that there are additional pages in the print job to be processed, so a branch is taken to step 247. At step 247, the DeltaGlyphs lists are reset. The next page, page 421c, is then begun at step 203.

At step 205, the first call on page 421c, TextOut ("jkl", Font4) is read. Because the call is a TextOut call, a branch is taken to step 207 where a determination is made as to whether the font referenced in the call, Font4 417, is identified in the pre-existing list. Because Font4 417 is on the server, it is identified in the pre-existing list and does not need to be copied to the spool file 403 in whole or in part. Therefore, a branch is taken from step 207 to step 209, where the call is incremented to the next call on the page, TextOut ("stu", Font2). The method 200 then continues at step 205.

Because the call is a TextOut call, a branch is taken from step 205 to step 207. A branch is then taken to step 211 since Font2 411 is not in the pre-existing list. Because the whole Font2 411 has not been copied to the spool file 403, a branch is taken to step 213. A branch is then taken to step 217 because Font2 411 has more than 3000 glyphs. At step 217, the glyphs referenced in the TextOut call, glyphs "stu", are added to the GlyphsSoFar list for Font2 411. At step 219, a branch is taken to step 221 since Font2 411 has been used on a previous page. At step 221, identifiers for the glyphs in the TextOut call which have not been used on a previous page, glyphs "stu", are added to the DeltaGlyphs list for Font2 411. The method 200 then proceeds to step 209, where the call is incremented to the next call, EndOfPage.

Because the call is an EndOfPage call, the method 200 proceeds from step 205 to step 223, and then to step 227. At step 227, a determination is made as to whether the page uses any font not identified in the pre-existing list of fonts which contain greater than or equal to the threshold number of glyphs. Because the page contains such a font, Font2 411, the method proceeds to step 229. At step 229, a determination is made as to whether the page 421c is the first to use Font2 411. Because Font2 411 was previously used on page 421a, a branch is taken to step 239. At step 239, the font delta for Font2 411 is created using the CreateFontPackage function and the DeltaGlyphs list for Font2 411. The font delta contains only glyphs "stu" and is written to the spool file 403 as record 423h at step 241. Because page 421c contains no more fonts to be subsetted, the method 200 proceeds to step 243 where the EMF record for page 421c is written to spool file 403 as record 423i.

At step 245, a determination is made that the end of the print job has been reached. At step 249 the EndOfFile record is written to the spool files and the method 200 ends.

Printing From a Spool File For An Exemplary Document

The method 300 may begin printing document 405 from the spool file 403 as soon as the text information record, or EMF record, for the first page 421a has been written to the spool file 403. In this manner, method 200 and method 300 are meant to proceed concurrently to allow printing while spooling. The method 300 for printing from the spool file 304 is described in detail below.

The method 300 begins at step 303 when the first text information record or EMF record has been written to the spool file 403. At step 303, the next record in the spool file 403 is read. The first record consists of a subsetted Font1 409 comprising glyphs "abc". At step 305 a determination is made that the record is not a whole font record, so the method 300 continues at step 303. At step 303, a determination is made as to whether the record is a new subsetted font. Because the record is a subsetted font, a branch is taken to step 311 where the subsetted font 430 is loaded from the spool file 403 into the memory of the print server using the AddRemoteFontToDC function call. The glyphs contained in the subsetted font for Font1 409 are now available for printing. The method 300 then continues at step 303 where the next record in the spool file 403 is read.

Because the next record in the spool file is also a subsetted font, subsetted Font2 411 comprising glyphs "def", the same steps are repeated as above. The glyphs contained in the subsetted font 433 are loaded onto the print server at step 311 and are now available for printing. The method 300 then continues at step 303 where the next record in the spool file 403 is read.

The next record in the spool file is the text information, or EMF, record for the first page. Therefore, the method 300 proceeds from step 303 to steps 305, 309, 313, and to step 321. In step 321 the text information record is processed by the print spooler and the page 421a is printed using the subsets of Font1 409 and Font2 411 loaded onto the server. The page is printed using the PlayEnhancedMetaFile function call. The only glyphs transmitted to the server were the glyphs necessary to print the first page. Because there are more records in the spool file 403, the method 300 proceeds from step 323 to step 303 where the next record in the spool file is read.

The next record in the spool file 403 is the whole font for Font3 413. Therefore, method 300 proceeds from step 305 to step 307 where the whole Font3 435 is loaded onto the print server using the AddRemoteFontToDC function call. The whole Font3 435 is now available for printing. The method 300 proceeds to step 303 where the next record in the spool file is read.

The next record in the spool file 403 is the font delta for Font 1 comprising glyph "d". Therefore, the method 300 proceeds from step 303 to steps 305, 309, and then to step 313. Because the record is a font delta, a branch is taken to step 315, where the font delta is merged with the subsetted font for Font1 409 which was previously loaded onto the server using the MergeFontPackage function call. The resulting subsetted font 437 comprises all of the glyphs contained in the old subsetted font ("abc" ) and all of the glyphs in the font delta ("d"). At step 317, the subsetted font is removed from the server using the RemoveRemoteFontDC function call. At step 319, the resulting merged font is loaded onto the server as the new subsetted font 437 for Font1 411 using the AddRemoteFontToDC function call.

At step 303 the next record in the spool file 403 is read. The next record is the text information record for page 421*b*. The page 421*b* is therefore printed at step 321 using the PlayEnhancedMetaFile function call. Because there are more records in the spool file 403, the method 300 again returns to step 303 where the next record in the spool file 403 is read. The next record in the spool file 403 is a font delta for Font2 411 comprising the glyphs "stu". Therefore, method 300 proceeds through steps 305, 309, 313, 315, 317, and 319, where the resulting merged font is loaded onto the print server for Font2 411 as described above. The merged font 439 comprises glyphs "defstu". At step 303 the next record in the spool file 403 is read.

The next record in the spool file 403 is the text information record for page 421*c*. Therefore, page 421*c* is printed at step 321 using the PlayEnhancedMetaFile function call. Note that because Font4 417 was already loaded on the server at the time of printing, there is no spool file record for Font4 417. Because there are no more records in the spool file 403, the method 300 proceeds to step 325. At step 325, all of the fonts loaded for the print job are deleted using the RemoveRemoteFontDC function call. The subsetted fonts 437 and 439 for Font1 409 and Font2 411, respectively, are deleted. Whole Font3 435 and the spool file itself are also deleted. Method 300 ends at step 325.

In summary, the present invention provides a method and system for remote printing using incremental font subsetting. The present invention comprises two separate methods. In a preferred embodiment, these methods are embodied in software modules incorporated into an operating system program. The first of these two methods processes the pages of a document to be printed and creates a spool file located on a remote server. Fonts are copied to the print server on a page by page basis and only those glyphs needed to print the page are copied. The second of these two methods processes the spool file generated by the first process and prints the document. As soon as the spool file records for the first page have been copied, the second method may begin printing the page. In this manner, printing while spooling may take place.

What is claimed is:

1. A computer-readable medium on which is stored a computer program for generating a spool file using incremental font subsetting on a server for a document comprising a plurality of pages, each of said plurality of pages comprising a plurality of calls, including calls comprising text information and an associated reference to a font comprising glyphs representing said text information, the computer program comprising instructions which, when executed by a computer, perform the steps of:

(a) determining whether a call on a page of said document is a call comprising text information and an associated reference to a font;
  (b) if it is determined that said call is a call comprising text information and an associated reference to a font, determining whether the font referenced in said call is identified in a pre-existing list of fonts;
  (c) if it is determined that said font is not identified in said pre-existing list of fonts, adding all of the glyphs referenced in said call to a first list for said fonts and determining whether said page is the first page in said document containing a call comprising text information and an associated reference to a font, referencing said font;
  (d) if it is determined that said page is not the first page containing a call comprising text information and an associated font referencing said font, adding all of the glyphs referenced in said call which have not been previously referenced to a list for said font.

2. The computer-readable medium of claim 1, further comprising the following steps after step (d):

(e) incrementing said call to the next call on said page and repeating from step (a).

3. The computer-readable medium of claim 2, further comprising the following steps after step (b):

(b1) if it is determined that said call is not a call comprising text information and an associated reference to a font, determining whether said call is an a call indicating that the end of said page has been reached;
  (b2) if it is determined that said call is a call indicating that the end of said page has been reached, determining whether said page contains calls comprising text information and an associated reference to a font, referencing fonts which are not identified in said pre-existing list of fonts;
  (b3) if it is determined that said page contains calls comprising text information and an associated reference to a font, referencing fonts which are not identified in said pre-existing list of fonts, determining whether said page is the first page on which one of said fonts not identified in said pre-existing list of fonts has been used;
  (b4) if it is determined that said page is the first page on which said font has been used, creating a subsetted font using said first list for said font and copying said subsetted font to a spool file on a server;
  (b5) if it is determined that said page is not the first page on which said font has been used, creating a font delta using said second list for said font and copying said font delta to said spool file on said server;
  (b6) determining whether there are more fonts referenced by calls comprising text information and an associated reference to a font on said page which are not identified in said pre-existing list of fonts;
  (b7) if it is determined that there are more fonts referenced by calls comprising text information and an associated reference to a font on said page which are not identified in said pre-existing list of fonts, incrementing said font to the next of such fonts and repeating from step (b3);
  (b8) if it is determined that there are no more fonts referenced by calls comprising text information and an associated reference to a font on said page which are not identified in said pre-existing list of fonts, copying the text information for said page to said spool file on said server.

4. The computer-readable medium of claim 3, further comprising the steps of:

(b9) determining whether there are more pages in said document to be printed;
  (b10) if it is determined that there are more pages in said document to be printed, deleting the contents of said second list for each font, incrementing said page to the next page in said document and repeating from step (a);
  (b11) if it is determined that there are no more pages in said document to be printed, creating an end of file record in said spool file on said server.

5. A computer-readable medium on which is stored a computer program for generating a spool file using incremental font subsetting on a server for a document comprising a plurality of pages, each of said plurality of pages comprising a plurality of calls, including calls comprising text information and an associated reference to a font comprising glyphs representing said text information, the computer program comprising instructions which, when executed by a computer, perform the steps of:

(a) determining whether a call on a page of said document is a call comprising text information and an associated reference to a font;

(b) if it is determined that said call is a call comprising text information and an associated reference to a font, determining whether the font referenced in said call is identified in a pre-existing list of fonts;

(c) if it is determined that said font is not identified in said pre-existing list of fonts, determining whether said font has been previously copied to a spool file on a server;

(d) if it is determined that said font has not been previously copied to said spool file, determining whether said font comprises more glyphs than a threshold number of glyphs;

(e) if it is determined that said font does not comprise more glyphs than a threshold number of glyphs, copying said font to said spool file;

(f) if it is determined that said font does not comprise more glyphs than said threshold number of glyphs, adding all of the glyphs referenced in said call to a first list for said font and determining whether said page is the first page in said document containing a call comprising text information and an associated reference to a font, referencing said font;

(g) if it is determined that said page is not the first page containing a call comprising text information and an associated reference to a font referencing said font, adding all of the glyphs referenced in said call which have not been previously referenced to a second list for said font;

(h) incrementing said call to the next call on said page and repeating from step (a).

6. The computer-readable medium of claim 5, further comprising the following steps after step (b):

(b1) if it is determined that said call is not a call comprising text information and an associated reference to a font, then determining whether said call is a call indicating that the end of said page has been reached;

(b2) if it is determined that said call is not a call indicating that the end of said page has been reached, then incrementing said call to the next call on said page and repeating from step (a);

(b3) if it is determined that said call is a call indicating that the end of said page has been reached, determining whether said page contains calls comprising text information and an associated reference to a font, referencing fonts which are not identified in said pre-existing list of fonts and which contain greater than or equal to said threshold number of glyphs;

(b4) if it is determined that said page contains calls comprising text information and an associated reference to a font, referencing fonts which are not identified in said pre-existing list of fonts and which contain greater than or equal to said threshold number of glyphs, determining whether said page is the first page on which one of said fonts has been used;

(b5) if it is determined that said page is the first page on which said font has been used, creating a subsetted font using said first list for said font and copying said subsetted font to said spool file on said server;

(b6) if it is determined that said page is not the first page on which said font has been used, creating a font delta using said second list for said font and copying said font delta to said spool file on said server;

(b7) determining whether there are more fonts referenced by calls comprising text information and an associated reference to a font on said page which are not identified in said pre-existing list of fonts and which contain greater than or equal to said threshold number of glyphs;

(b8) if it is determined that there are more fonts referenced by calls comprising text information and an associated reference to a font on said page which are not identified in said pre-xisting list of fonts and which contain greater than or equal to said threshold number of glyphs, incrementing said font to the next of such fonts and repeating from step (b4);

(b9) if it is determined that there are no more fonts referenced by calls comprising text information and an associated reference to a font on said page which are not identified in said pre-existing list of fonts and which contain greater than or equal to said threshold number of glyphs, copying the text information for said page to said spool file on said server;

(b10) determining whether there are more pages in said document to be printed;

(b11) if it is determined that there are more pages in said document to be printed, deleting the contents of said second list for each font, incrementing said page to the next page in said document and repeating from step (a);

(b12) if it is determined that there are no more pages in said document to be printed, creating an end of file record in said spool file on said server.

7. A method for generating a spool file using incremental font subsetting on a server for a document comprising a plurality of pages, each of said plurality of pages comprising a plurality of calls, including calls comprising text information and an associated reference to a font comprising glyphs representing said text information, the method comprising the steps of:

(a) determining whether a call on a page of said document is a call comprising text information and an associated reference to a font;

(b) if it is determined that said call is a call comprising text information and an associated reference to a font, determining whether the font referenced in said call is identified in a pre-existing list of fonts;

(c) if it is determined that said font is not identified in said pre-existing list of fonts, adding all of the glyphs referenced in said call to a first list for said font and determining whether said page is the first page in said document containing a call comprising text information and an associated reference to a font referencing said font;

(d) if it is determined that said page is not the first page containing a call comprising text information and an associated reference to a font, referencing said font, adding all of the glyphs referenced in said call which have not been previously referenced to a second list for said font.

8. The method of claim 7, wherein step (e) comprises incrementing said call to the next call on said page and repeating from step (a).

9. The method of claim 8, further comprising the following steps after step (b):

(b1) if it is determined that said call is not a call comprising text information and an associated reference to a font, then determining whether said call is a call indicating that the end of said page has been reached;

(b2) if it is determined that said call is a call indicating that the end of said page has been reached, determining whether said page contains calls comprising text information and an associated reference to a font, referencing fonts which are not identified in said pre-existing list of fonts;

(b3) if it is determined that said page contains calls comprising text information and an associated reference to a font referencing fonts which are not identified in said pre-existing list of fonts, determining whether said page is the first page on which one of said fonts which are not identified in said pre-existing list of fonts has been used;

(b4) if it is determined that said page is the first page on which said font has been used, creating a subsetted font using said first list for said font and copying said subsetted font to said spool file on said server;

(b5) if it is determined that said page is not the first page on which said font has been used, creating a font delta using said second list for said font and copying said font delta to said spool file on said server;

(b6) determining whether there are more fonts referenced by calls comprising text information and an associated reference to a font on said page which are not identified in said pre-existing list of fonts;

(b7) if it is determined that there are more fonts referenced by calls comprising text information and an associated reference to a font on said page which are not identified in said pre-existing list of fonts, incrementing said font to the next of such fonts and repeating from step (b3);

(b8) if it is determined that there are no more fonts referenced by calls comprising text information and an associated reference to a font on said page which are not identified in said pre-existing list of fonts, copying the text information for said page to said spool file on said server.

10. The method of claim 9, further comprising the steps of:

(b9) determining whether there are more pages in said document to be printed;

(b10) if it is determined that there are more pages in said document to be printed, deleting the contents of said second list for each font, incrementing said page to the next page in said document and repeating from step (a);

(b11) if it is determined that there are no more pages in said document to be printed, creating an end of file record in said spool file on said server.

11. A method for generating a spool file using incremental font subsetting on a server for a document comprising a plurality of pages, each of said plurality of pages comprising a plurality of calls, including calls comprising text information and an associated reference to a font comprising glyphs representing said text information, the method comprising the steps of:

(a) determining whether a call on a page of said document is a call comprising text information and an associated reference to a font;

(b) if it is determined that said call is a call comprising text information and an associated reference to a font, determining whether the font referenced in said TextOut call is identified in a pre-existing list of fonts;

(c) if it is determined that said font is not identified in said pre-existing list of fonts, determining whether said font has been previously copied to a spool file on a server;

(d) if it is determined that said font has not been previously copied to said spool file, determining whether said font comprises more glyphs than a threshold number of glyphs;

(e) if it is determined that said font does not comprise more glyphs than a threshold number of glyphs, copying said font to said spool file;

(f) if it is determined that said font does not comprise more glyphs than said threshold number of glyphs, adding all of the glyphs referenced in said call to a first list for said font and determining whether said page is the first page in said document containing a call comprising text information and an associated reference to a font referencing said font;

(g) if it is determined that said page is not the first page containing a call comprising text information and an associated reference to a font referencing said font, adding all of the glyphs referenced in said call which have not been previously referenced to a second list for said font;

(h) incrementing said call to the next call on said page and repeating from step (a).

12. The method of claim 11, further comprising the following steps after step (b):

(b1) if it is determined that said call is not a call comprising text information and an associated reference to a font, then determining whether said call is a call indicating that the end of said page has been reached;

(b2) if it is determined that said call is not an end of page call, then incrementing said call to the next call on said page and repeating from step (a);

(b3) if it is determined that said call is an end of page call, determining whether said page contains calls comprising text information and an associated reference to a font referencing fonts which are not identified in said pre-existing list of fonts and which contain greater than or equal to said threshold number of glyphs;

(b4) if it is determined that said page contains calls comprising text information and an associated reference to a font, referencing fonts which are not identified in said pre-existing list of fonts and which contain greater than or equal to said threshold number of glyphs, determining whether said page is the first page on which one of said fonts has been used;

(b5) if it is determined that said page is the first page on which said font has been used, creating a subsetted font using said first list for said font and copying said subsetted font to said spool file on said server;

(b6) if it is determined that said page is not the first page on which said font has been used, creating a font delta using said second list for said font and copying said font delta to said spool file on said server;

(b7) determining whether there are more fonts referenced by calls comprising text information and an associated reference to a font on said page which are not identified in said pre-existing list of fonts and which contain greater than or equal to said threshold number of glyphs;

(b8) if it is determined that there are more fonts referenced by calls comprising text information and an associated reference to a font on said page which are not identified in said pre-existing list of fonts and which contain greater than or equal to said threshold number of glyphs, incrementing said font to the next of such fonts and repeating from step (b4);

(b9) if it is determined that there are no more fonts referenced by calls comprising text information and an associated reference to a font on said page, which are not identified in said pre-existing list of fonts and which contain greater than or equal to said threshold number of glyphs, copying the text information for said page to said spool file on said server;

(b10) determining whether there are more pages in said document to be printed;

(b11) if it is determined that there are more pages in said document to be printed, deleting the contents of said second list for each font, incrementing said page to the next page in said document and repeating from step (a);

(b12) if it is determined that there are no more pages in said document to be printed, creating an end of file record in said spool file on said server.

13. A computer system for generating a spool file on a server using incremental font subsetting, the computer system comprising:

a processor;

a memory coupled to the processor, the memory maintaining a document comprising a plurality of pages, each of said plurality of pages comprising a plurality of calls, including calls comprising text information and an associated reference to a font comprising glyphs representing said text information;

a networked server comprising a storage unit;

the networked server being operative to receive data transmitted from said processor and to write said data to a record in a spool file on said storage unit;

the processor being operative to:

(a) determine whether a call on a page of said document in said memory is a call comprising text information and an associated reference to a font;

(b) if it is determined that said call is a call comprising text information and an associated reference to a font, said processor operative to determine whether the font referenced in said call is identified in a pre-existing list of fonts;

(c) if it is determined that said font is not identified in said pre-existing list of fonts, said processor operative to determine whether said font has been previously copied to a spool file on a server;

(d) if it is determined that said font has not been previously copied to said spool file, said processor operative to determine whether said font comprises more glyphs than a threshold number of glyphs;

(e) if it is determined that said font does not comprise more glyphs than a threshold number of glyphs, said processor operative to transmit said font to said server;

(f) if it is determined that said font does not comprise more glyphs than said threshold number of glyphs, said processor operative to add all of the glyphs referenced in said call to a first list for said font and to determine whether said page is the first page in said document containing a call comprising text information and an associated reference to a font referencing said font;

(g) if it is determined that said page is not the first page containing a call comprising text information and an associated reference to a font referencing said font, said processor operative to add all of the glyphs referenced in said call which have not been previously referenced to a second list for said font;

(h) increment said call to the next call on said page and repeat from step (a).

14. The computer system of claim 13, wherein said processor is further operative to perform the following steps after step (b):

(b1) if it is determined that said call is not a call comprising text information and an associated reference to a font, said processor operative to determine whether said call is a call indicating that the end of said page has been reached;

(b2) if it is determined that said call is not a call indicating that the end of said page has been reached, said processor operative to increment said call to the next call on said page and repeat from step (a);

(b3) if it is determined that said call is an end-of-page call, said processor operative to determine whether said page contains calls comprising text information and an associated reference to a font referencing fonts which are not identified in said pre-existing list of fonts and which contain greater than or equal to said threshold number of glyphs;

(b4) if it is determined that said page contains calls comprising text information and an associated reference to a font referencing fonts which are not identified in said pre-existing list of fonts and which contain greater than or equal to said threshold number of glyphs, said processor operative to determine whether said page is the first page on which one of said fonts has been used;

(b5) if it is determined that said page is the first page on which said font has been used, said processor operative to create a subsetted font using said first list for said font and to transmit said subsetted font to said server;

(b6) if it is determined that said page is not the first page on which said font has been used, said processor operative to create a font delta using said second list for said font and to transmit said font delta to said server;

(b7) determine whether there are more fonts referenced by calls comprising text information and an associated reference to a font on said page which are not identified in said pre-existing list of fonts and which contain greater than or equal to said threshold number of glyphs;

(b8) if it is determined that there are more fonts referenced by calls comprising text information and an associated reference to a font on said page which are not identified in said pre-existing list of fonts and which contain greater than or equal to said threshold number of glyphs, said processor operative to increment said font to the next of such fonts and repeat from step (b4);

(b9) if it is determined that there are no more fonts referenced by calls comprising text information and an associated reference to a font on said page which are not identified in said pre-existing list of fonts and which contain greater than or equal to said threshold number of glyphs, said processor operative to transmit the text information for said page to said server;

(b10) determine whether there are more pages in said document to be printed;

(b11) if it is determined that there are more pages in said document to be printed, said processor operative to delete the contents of said second list for each font, increment said page to the next page in said document and repeat from step (a);

(b12) if it is determined that there are no more pages in said document to be printed, said processor operative to transmit an end of file record to said server.

* * * * *